US012618353B1

(12) United States Patent
Banks, III et al.

(10) Patent No.: US 12,618,353 B1
(45) Date of Patent: May 5, 2026

(54) LOW RESISTANCE EXHAUST SYSTEM WITH CORRECTION MODULE FOR REGENERATION CONTROL

(71) Applicant: Gale C. Banks, III, Bradbury, CA (US)

(72) Inventors: Gale C. Banks, III, Bradbury, CA (US); Quinn Alexander Smith, Altadena, CA (US)

(73) Assignee: Gale Banks, Bradbury, CA (US)

( * ) Notice: Subject to any disclaimer, the term of this patent is extended or adjusted under 35 U.S.C. 154(b) by 0 days.

(21) Appl. No.: 19/354,586

(22) Filed: Oct. 9, 2025

(51) Int. Cl.

| | |
|---|---|
| ***F01N 9/00*** | (2006.01) |
| ***F01N 3/023*** | (2006.01) |
| ***F01N 3/025*** | (2006.01) |
| ***F01N 3/027*** | (2006.01) |
| ***F01N 11/00*** | (2006.01) |
| ***F02D 41/02*** | (2006.01) |

(52) U.S. Cl.
CPC ........... *F01N 9/002* (2013.01); *F01N 3/0253* (2013.01); *F01N 3/027* (2013.01); *F02D 41/029* (2013.01); *F01N 3/023* (2013.01); *F01N 11/002* (2013.01); *F01N 2550/04* (2013.01); *F01N 2560/08* (2013.01); *F01N 2900/1606* (2013.01); *F02D 2200/0812* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,152,853 | A | 11/2000 | Banks, III | |
| 6,634,171 | B1 | 10/2003 | Banks, III | |
| 6,863,044 | B2 | 3/2005 | Nakamura et al. | |
| D558,111 | S | 12/2007 | Banks | |
| 8,468,812 | B1 | 6/2013 | Banks, III | |
| 9,062,639 | B1 | 6/2015 | MacKenzie et al. | |
| 9,149,801 | B2 * | 10/2015 | Whitt | B01D 53/9418 |
| 10,125,729 | B1 | 11/2018 | Mashburn | |
| 10,465,640 | B1 | 11/2019 | Wolgamott | |
| 10,513,994 | B2 * | 12/2019 | Sammer | F01N 11/002 |
| D881,096 | S | 4/2020 | Banks, III | |
| 11,131,224 | B1 * | 9/2021 | Dea | F01N 13/08 |
| 11,193,441 | B1 | 12/2021 | Banks, III | |
| 2004/0159099 | A1 * | 8/2004 | Kuboshima | F02D 41/2474 60/297 |

(Continued)

OTHER PUBLICATIONS

Owner's Manual Banks Monster Exhaust, Apr. 2, 2025.

*Primary Examiner* — Binh Q Tran
(74) *Attorney, Agent, or Firm* — Batt IP A Law Corporation; Richard Batt

(57) ABSTRACT

A low resistance exhaust system with regeneration control includes a correction module. The correction module is programmed and operable to receive pressure signals from a sensor assembly measuring pressure across an exhaust particulate filter, and to compute a corrected pressure signal to send to the vehicle engine control module (ECM). The corrected pressure signal allows the ECM to properly evaluate the pressure signals arising from the use of a low resistance aftermarket exhaust outlet tube. This allows the ECM to accurately execute regeneration actions to properly manage soot buildup in the exhaust particulate filter despite being calibrated for the OEM/stock exhaust outlet tube, and to avoid triggering DTCs.

23 Claims, 6 Drawing Sheets

(56) References Cited

U.S. PATENT DOCUMENTS

| | | | | |
|---|---|---|---|---|
| 2010/0058743 | A1* | 3/2010 | Tsukada | F01N 3/0253 60/287 |
| 2011/0209460 | A1* | 9/2011 | He | F01N 9/002 95/20 |
| 2012/0312270 | A1 | 12/2012 | Kaiser et al. | |
| 2013/0232958 | A1* | 9/2013 | Ancimer | B01D 53/9495 422/111 |
| 2016/0038507 | A1 | 2/2016 | Karlsson et al. | |
| 2017/0074146 | A1* | 3/2017 | Maletic | F01N 11/002 |
| 2019/0048776 | A1* | 2/2019 | Van Nieuwstadt | F01N 1/168 |
| 2019/0366256 | A1* | 12/2019 | Dahlgren | F01N 9/002 |
| 2020/0049082 | A1 | 2/2020 | Hjelm et al. | |
| 2021/0025343 | A1 | 1/2021 | Fiello et al. | |

* cited by examiner

| EPF Soot Load Percent (%) | EPF Regen Status | EPF Delta Pressure - Raw | EPF Delta Pressure - Corrected |
|---|---|---|---|
| 57 | 0 | 0.06 | 0.05 |
| 58 | 0 | 0.07 | 0.06 |
| 59 | 0 | 0.11 | 0.09 |
| 60 | 0 | 0.15 | 0.13 |
| 61 | 0 | 0.18 | 0.15 |
| 62 | 0 | 0.21 | 0.18 |
| 63 | 0 | 0.26 | 0.22 |
| 64 | 0 | 0.28 | 0.24 |

Fig. 4

LOW RESISTANCE EXHAUST SYSTEM WITH CORRECTION MODULE FOR REGENERATION CONTROL

CROSS-REFERENCE TO RELATED APPLICATIONS

None.

FIELD OF THE INVENTION

The field of the present invention is exhaust systems for combustion engines, and more particularly, exhaust systems for vehicle combustion engines.

BACKGROUND

Current vehicle exhaust emissions systems include exhaust particulate filters (EPF), which may be either a diesel particulate filter (DPF) or a gasoline particulate filter (GPF) according to the engine fuel type. These systems employ ceramic honeycomb structures (typically cordierite or silicon carbide) placed in the exhaust flow to trap particulate matter (PM) including fine PM2.5 carbon nanoparticles (soot) produced by the combustion process. As the exhaust gasses pass through the porous walls of the filter 85 to 100% of the soot is trapped and the cleaner gasses are allowed to exit. The soot trapped by the EPF accumulates over time, and if left unmanaged may clog the filter and increase backpressure, potentially harming engine performance. The amount of soot resident in the EPF is monitored by the engine control module (ECM) and is commonly referred to as the soot load and expressed as a percentage of total capacity.

Management of the soot load is typically accomplished through a process, referred to as regeneration, in which the EPF is heated to a temperature sufficient to combust the trapped soot, converting it into less harmful gasses like carbon dioxide. Regeneration may occur without outside intervention when operating the vehicle in a manner such that exhaust gas temperature is sufficiently high as to burn off soot from the EPF. This typically occurs during highway driving and is referred to as passive regeneration.

When passive regeneration is not able to adequately reduce soot load the ECM will intervene in a process referred to as active regeneration. During active regeneration the ECM may alter the combustion air/fuel ratio, inject fuel into the exhaust stream, or use a heater to raise exhaust gas temperatures (often to 600° C. or higher) to burn off the soot. After regeneration, a small amount of incombustible ash (from engine oil additives or fuel impurities) remains in the filter. Over hundreds of thousands of miles this ash can accumulate, requiring the filter to be professionally cleaned or replaced.

In order to track the condition of the system the ECM typically monitors the difference in exhaust pressure between the inlet and outlet of the EPF as a measurement of soot load percentage. As soot accumulates within the exhaust particulate filter (EPF), it gradually reduces the available flow area for exhaust gases. Consequently, as the soot load percentage increases, the pressure drop from the inlet to the outlet rises proportionally, due to the increasing restriction to gas flow.

This measurement is commonly taken by a differential pressure sensor (DPS) which measures the pressure drop (AP) across the filter via two ports connected by tubes to the EPF inlet and outlet. A diaphragm or piezoelectric element inside converts AP into a voltage, frequency, or digital signal which is provided to the ECM to calculate soot load.

Alternatively, this measurement may be taken by two discrete pressure sensing elements. The difference in their reported values is then calculated either by the vehicle ECM or within an integrated module. The DPS signal is used for triggering active regeneration, tracking ash, and preventing clogs that could elevate backpressure and set diagnostic trouble codes (DTCs), trigger a power de-rate, or put the vehicle in a limp home mode.

Statement of Problem

When an enhanced exhaust system with reduced flow restriction is introduced downstream of the EPF, the pressure at the EPF outlet may be significantly reduced. This is commonly referred to as a reduction in backpressure. This backpressure reduction is propagated throughout the entire exhaust system and to the engine's piston(s), which resultingly expend less work on the exhaust stroke pumping exhaust gasses out of the cylinder(s). This reduction of parasitic load on the engine both adds to the maximum power output of the engine and reduces the amount of fuel required when compared at the same power output. This effect is even more meaningful in turbocharged engines wherein parasitic losses to pumping are considerably larger in magnitude, and the turbine expansion ratio can cause a backpressure reduction at the tailpipe to be tripled or quadrupled at the piston(s). These positive effects are prevented in modern vehicles because the DPS and ECM are calibrated to the original manufacturers more restrictive exhaust assemblies.

While reduced restriction exhaust systems provide for a decreased exhaust backpressure that propagates through the entire exhaust system, the backpressure reduction at the EPF outlet is commonly larger in magnitude than at the EPF inlet, thus increasing the magnitude of the DPS reading. The ECM is unable to compensate for the change to the downstream exhaust system and, as a result, erroneously interprets this reading to signify that the soot load of the EPF is greater than it is in reality. The most common result of this is that the ECM will conduct frequent and unnecessary active regeneration cycles and trigger DTCs.

Additional unnecessary regeneration cycles decrease the lifespan of the EPF, incur a cost to fuel efficiency, cause excessive thermal stressing of the EPF, overheat exhaust parts, and accelerate wear on engine and emissions components. Active regenerations can also create driver inconveniences such as forced high idle, diagnostic trouble codes, and can in certain cases trigger the ECM to de-rate engine power or impose a limp mode. In GPF systems the heat of frequent active regeneration cycles can also degrade the commonly integrated three-way catalyst, increasing NOx or CO emissions over time.

The above described problems have become more prevalent with the size of the aftermarket growing and continuing to provide performance options not available from the original equipment manufacturers of vehicles. The increased monitoring and control of current engine control modules (ECM) have created impediments to such aftermarket upgrades. As the control systems of modern vehicles continue to become more precisely monitored, even small changes to sensed conditions can incur impacts which prevent the use of a system which could otherwise improve performance and efficiency with no negative impact to emissions system efficacy.

Accordingly, a new and improved system that overcomes the above mentioned shortcomings is desired.

SUMMARY OF THE INVENTION

An embodiment of the present invention comprises an exhaust particulate filter (EPF) regeneration control system with a regeneration correction module (RCM) that mitigates the issue of frequent active regenerations by amending one or more pressure signals from the DPS prior to reporting to the ECM.

In embodiments of the present invention, one or more pressure, or differential pressure, values are reported to the RCM and are amended to accurately reflect the actual soot load percentage of the EPF. In embodiments, the RCM is operable to amend the values using a table established by empirical data collection. In other embodiments, the RCM is operable to amend the values using a trained machine learning model. By providing amended values, the ECM receives signals accurately reflective of EPF soot load and will manage systems appropriately without incurring the negative effects arising from excess active regeneration cycles as described above.

In embodiments of the present invention, an exhaust system for internal combustion engines provides for reduced exhaust gas backpressure. A sensor (or sensors) provides for measurement of the difference in pressure between the inlet and the outlet of an exhaust particulate filter (EPF) as a measurement of filter soot load percentage. A correction module comprising a central processing unit (CPU) is electronically located between the pressure sensor(s) and the vehicle engine control module (ECM) calibrated to receive signals from the original equipment exhaust pressure sensors. The correction module is programmed and operable to correct the exhaust system pressure signals sent to the ECM for proper management of the EPF system.

In embodiments of the present invention, the correction module is arranged to receive a value representative of the difference in pressure between the inlet and outlet of the EPF, both discrete pressure values, or other configurations of exhaust and/or ambient pressure signals.

In embodiments of the present invention, the correction module is programmed and operable to receive the signal from the DPS and to output to the ECM an adjusted or corrected value. In embodiments, the corrected value is intended for ensuring proper regeneration and cleaning of the EPF. To accommodate for replacing a stock exhaust system with a lower restriction exhaust system, the systems and methods described herein control the behavior of the EPF monitoring and regeneration system.

In embodiments of the present invention, the correction module is programmed and operable to modify a raw pressure sensor signal based on a pre-determined set of rules or pressure lookup table. In embodiments, the lookup table is generated from empirical data, mapping the stock exhaust system pressure signal (stock signal) to the raw signal arising from the low resistance exhaust system based on the soot load. Then, using the lookup table, the correction module can transform or map a raw signal arising from the low resistance exhaust system to the corrected signal.

In embodiments of the present invention, the correction module is programmed and operable to modify a raw pressure sensor signal based on a pre-determined equation. In embodiments, the equation is generated by curve fitting a linear or non-linear equation to a set of empirical data, mapping the stock exhaust system pressure signal (stock signal) to the raw signal arising from the low resistance exhaust system based on the soot load. Then, using the equation, the correction module can compute a corrected signal to send to the ECM based on the raw signal arising from the low resistance exhaust system.

In embodiments of the present invention, the correction module is programmed and operable to modify a raw pressure sensor signal based on a trained machine learning model. In embodiments, the machine learning model is selected from the group including decision trees, random forests, or neural networks. In embodiments, the model is trained based on a labelled dataset, mapping the stock exhaust system pressure signal (stock signal) to the raw signal arising from the low resistance exhaust system based on the soot load. Once the model is trained, the correction module can compute a corrected signal to send to the ECM based on the raw signal arising from the use of a low resistance exhaust system.

An object of the present invention is to provide enhanced vehicle exhaust systems for use with original equipment ECMs and without compromising the efficacy or longevity of emissions and engine systems, and without incurring further negative erroneous responses from the ECM.

BRIEF DESCRIPTION OF FIGURES

The above-mentioned aspects, as well as other features, aspects, and advantages of the present technology will now be described in connection with various embodiments with reference to the accompanying drawings. The illustrated embodiments, however, are merely examples and are not intended to be limiting. Throughout the drawings, similar symbols typically identify similar components, unless context dictates otherwise where:

FIG. 4 shows a portion of a lookup table for correlating a raw DPS signal arising from an enhanced exhaust system to a corrected signal according to soot load in accordance with an embodiment of the invention;

DESCRIPTION OF THE INVENTION

Figure 1:
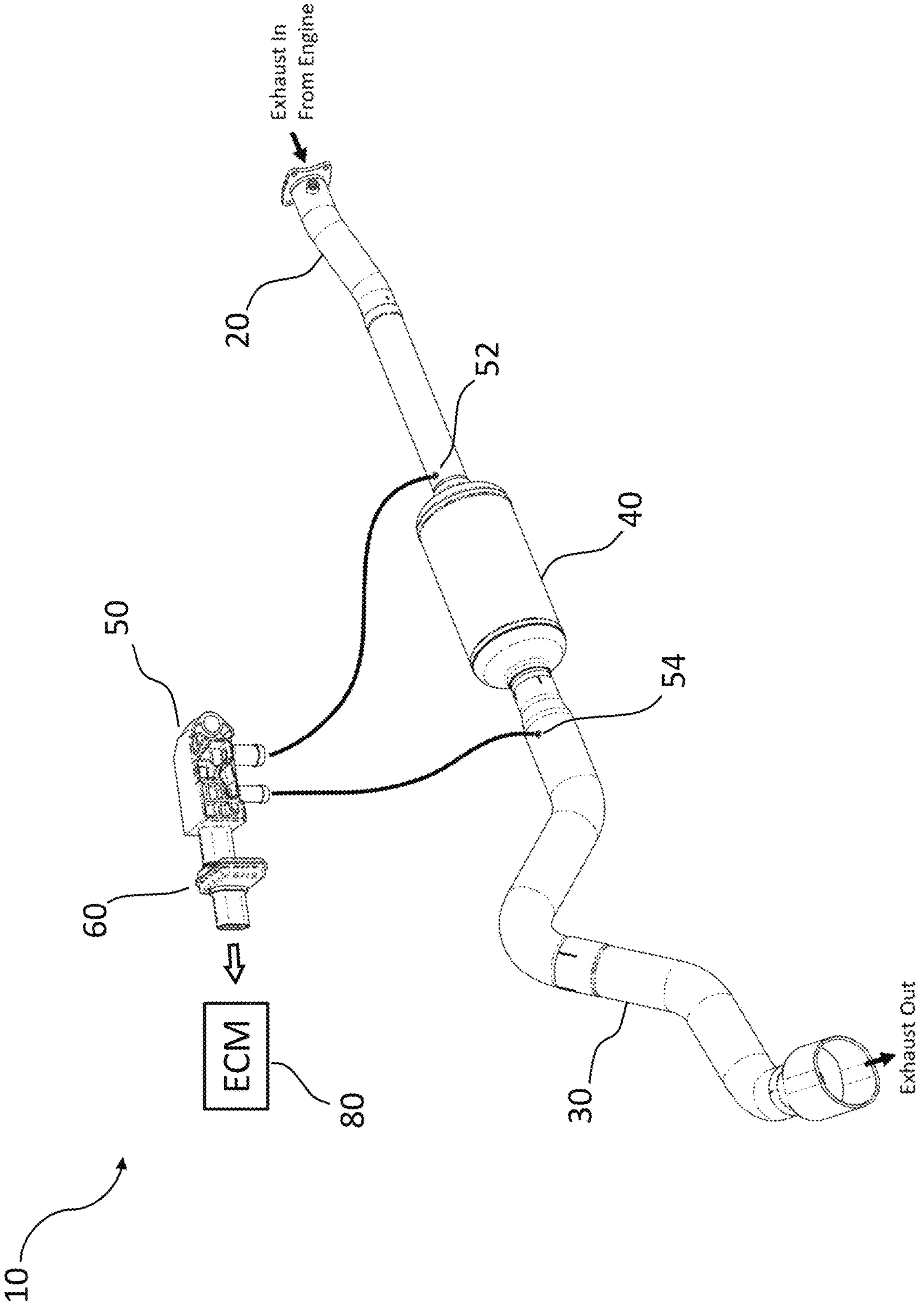
FIG. 1 is an illustration of a low resistance exhaust system in accordance with embodiments of the invention.

It is to be understood that the embodiments of the invention described herein are not limited to particular variations set forth herein as various changes or modifications may be made to the embodiments of the invention described and equivalents may be substituted without departing from the spirit and scope of the embodiments of the invention. As will be apparent to those of skill in the art upon reading this disclosure, each of the individual embodiments described and illustrated herein has discrete components and features that may be readily separated from or combined with the features of any of the other several embodiments without departing from the scope or spirit of the embodiments of the present invention. In addition, many modifications may be made to adapt a particular situation, material, composition of matter, process, process act(s) or step(s) to the objective(s), spirit or scope of the embodiments of the present invention. All such modifications are intended to be within the scope of the invention.

Additionally, the separation of various system components in the implementations described herein should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Reference to a singular item, includes the possibility that there are plural of the same items present. More specifically, as used herein and in the appended claims, the singular forms "a," "an," "said" and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

It will also be understood that, although the terms first, second, etc. may be used herein to describe various elements, these elements should not be limited by these terms. These terms are only used to distinguish one element from another. Thus, a first element could be termed a second element without departing from the teachings of the present invention.

Some embodiments have been described in connection with the accompanying drawings. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

All existing subject matter mentioned herein (e.g., publications, patents, patent applications and hardware) is incorporated by reference herein in its entirety except insofar as the subject matter may conflict with that of the present invention (in which case what is present herein shall prevail).

FIG. 1 shows an enhanced vehicle exhaust system 10 in accordance with embodiments of the invention.

The system 10 shows an exhaust inlet tube 20 joined to a reduced resistance exhaust outlet tube 30 by an exhaust particulate filter (EPF) 40 as described above. An example of a suitable reduced resistance aftermarket exhaust outlet tube assembly is the Banks Monster Exhaust® System model 48996, manufactured by Banks Power (Azusa, California). In embodiments of the invention, the low resistance exhaust outlet tube comprises a shape and cross sectional area to reduce the backpressure. In some embodiments, the aftermarket product has a flow area of 190% greater than the OEM outlet tube, and a reduction in backpressure of about 90%.

A differential pressure sensor (DPS) 50 is shown for measuring the pressure drop (AP) across the filter via two ports connected by tubes to the EPF inlet 52 and outlet 54.

A correction module for regeneration control 60 (hereinafter typically referred to as a regeneration correction module) is shown connected to the DPS and, as described herein, is operable to amend or modify the signal before sending a corrected signal to the engine control module (ECM) 80.

Figure 2:
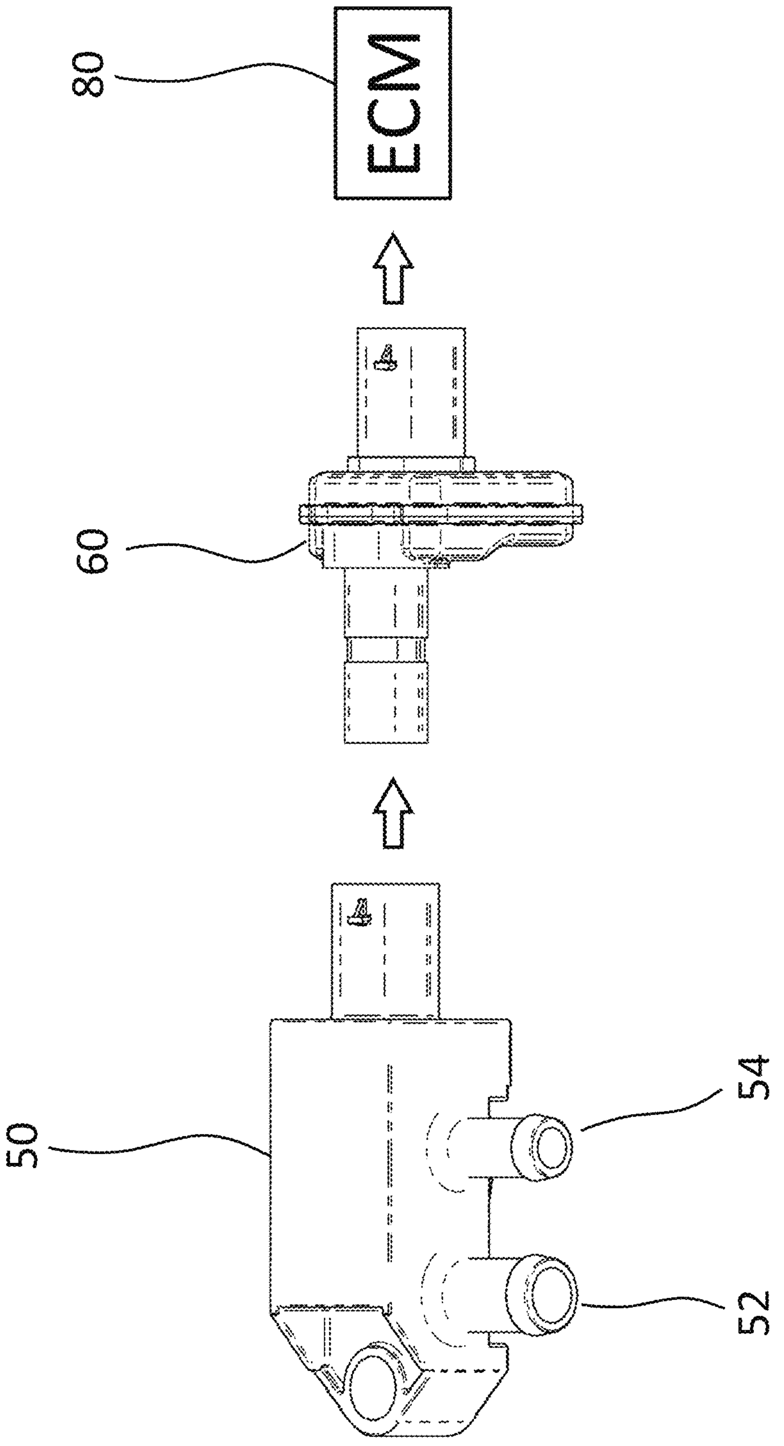
FIG. 2 is an enlarged illustration of a pressure sensor, regeneration correction module, and engine control module in accordance with embodiments of the invention.

With reference to FIG. 2, an enlarged exploded view is shown of the DPS 50, regeneration correction module 60, and ECM 80.

Figure 3:
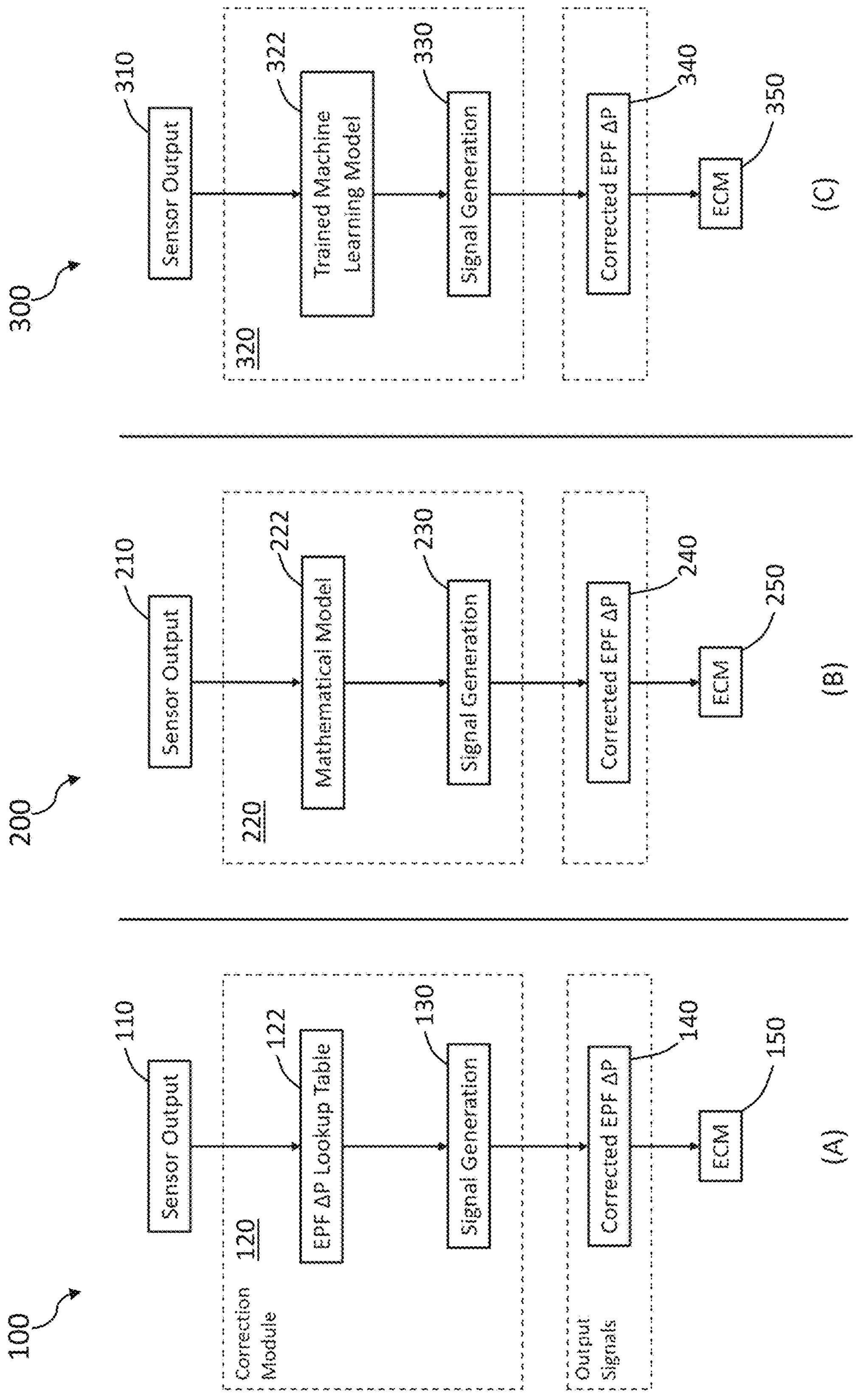
FIGS. 3A-3C are flow charts of various methods for correcting the raw pressure sensor signal when using a low resistance exhaust system in accordance with embodiments of the invention.

FIGS. 3A-3C are flow charts of various methods for providing a corrected AP signal to the ECM for low resistance or otherwise modified exhaust systems in accordance with embodiments of the present invention.

With reference to FIG. 3A, step 110 states sensor output. In embodiments, this step is performed by a DPS such as the DPS 50 shown in FIG. 1. In embodiments, a diaphragm or piezoelectric element inside the DPS converts AP into a voltage, frequency, or digital signal.

Step 122 states EPF AP lookup table. This step can be performed by a programmed processor and memory comprising a lookup table of empirical values. In embodiments, a correction module 120 is programmed and operable to modify a raw pressure sensor signal based on the lookup table. In embodiments, the lookup table is generated from empirical data, mapping the original equipment manufacturer's DPS signal (e.g., OEM or stock signal) to the raw DPS signal arising from the low resistance exhaust system based on the soot load.

For example, a first dataset is generated by measuring the AP arising from an OEM/stock exhaust system and the soot load, and optionally in combination with one or more of the following: engine speed, vehicle speed, engine loads, intake air mass, or other relevant parameters.

Next, in embodiments, a second dataset is generated by measuring the AP arising from an enhanced low resistance exhaust system and the soot load, and optionally in combination with one or more of the other parameters recorded for the first dataset.

The datasets are merged together into the lookup table based on the soot load, and optionally by any other dimensions recorded during the testing. An example of a portion of a lookup table is shown in FIG. 4 where the regeneration status indicates whether or not an active regeneration cycle is underway in which '0' denotes no action is being taken and '1' denotes that an active regeneration cycle is being performed; 'Raw' refers to the DPS signal from the enhanced exhaust system, and 'Corrected' refers to the adjusted or corrected signal to be sent to the ECM.

In embodiments, a lookup table is generated for each engine/fuel type such that each engine/fuel type has a dedicated lookup table.

The lookup table is installed in the correction module. Then, using the lookup table, the correction module can map a raw signal arising from the low resistance exhaust system to a corrected signal.

Step 130 states signal generation. This step is performed by generating a corrected signal (e.g., a digital transmission such as a frequency or amplitude modulated current, or voltage) based on the mapped value from step 122.

Step 140 shows the output signal. This is the corrected signal generated by the signal generator from step 130.

Step 150 is the engine control module for evaluating the signal and making decisions for regeneration, as described herein.

FIG. 3B is a flowchart of another method for providing a corrected AP signal to the ECM for low resistance or otherwise modified exhaust systems in accordance with embodiments of the present invention. The method illustrated in FIG. 3B is similar to that described above in connection with FIG. 3A, except for step 222 which determines the amended value of the corrected signal. In the embodiment shown in FIG. 3B, a correction module 220 is programmed and operable to modify a raw pressure sensor signal based on a pre-determined equation. In embodiments, the equation is generated by curve fitting a linear or non-linear equation to a set of empirical data, mapping the OEM/stock exhaust system pressure signal (OEM/stock signal) to the raw signal arising from the low resistance exhaust system based on the soot load. Then, using the equation, the correction module can compute a corrected signal based on the raw signal arising from the low resistance exhaust system.

The remaining steps can proceed similar to the method described above in connection with FIG. 3A.

In embodiments, an equation is generated for each engine/fuel type such that each engine/fuel type has a dedicated equation.

FIG. 3C is a flowchart of another method for providing a corrected AP signal to the ECM for low resistance or otherwise modified exhaust systems in accordance with embodiments of the present invention. The method illustrated in FIG. 3C is similar to that described above in connection with FIG. 3A, except for step 322 which determines the amended value of the corrected signal. In the embodiment shown in FIG. 3C, a correction module 320 is programmed and operable to modify a raw pressure sensor signal based on a trained machine learning model. In embodiments, the machine learning model is selected from the group including decision trees, random forests, or neural networks. In embodiments, the model is trained based on a labelled dataset, mapping the OEM/stock exhaust system pressure signal (stock signal) to the raw signal arising from the low resistance exhaust system by the soot load. Once the model is trained, the correction module can compute a corrected signal based on the raw signal arising from the low resistance exhaust system.

The features on which the model is trained can vary and include one or more of the following: AP, soot load, engine speed, vehicle speed, engine loads, intake air mass, etc.

The remaining steps can proceed similar to the method described above in connection with FIG. 3A.

In embodiments, a machine learning model is trained, evaluated and tested for each engine/fuel type such that each engine/fuel type has a dedicated trained machine learning model.

Figure 5:
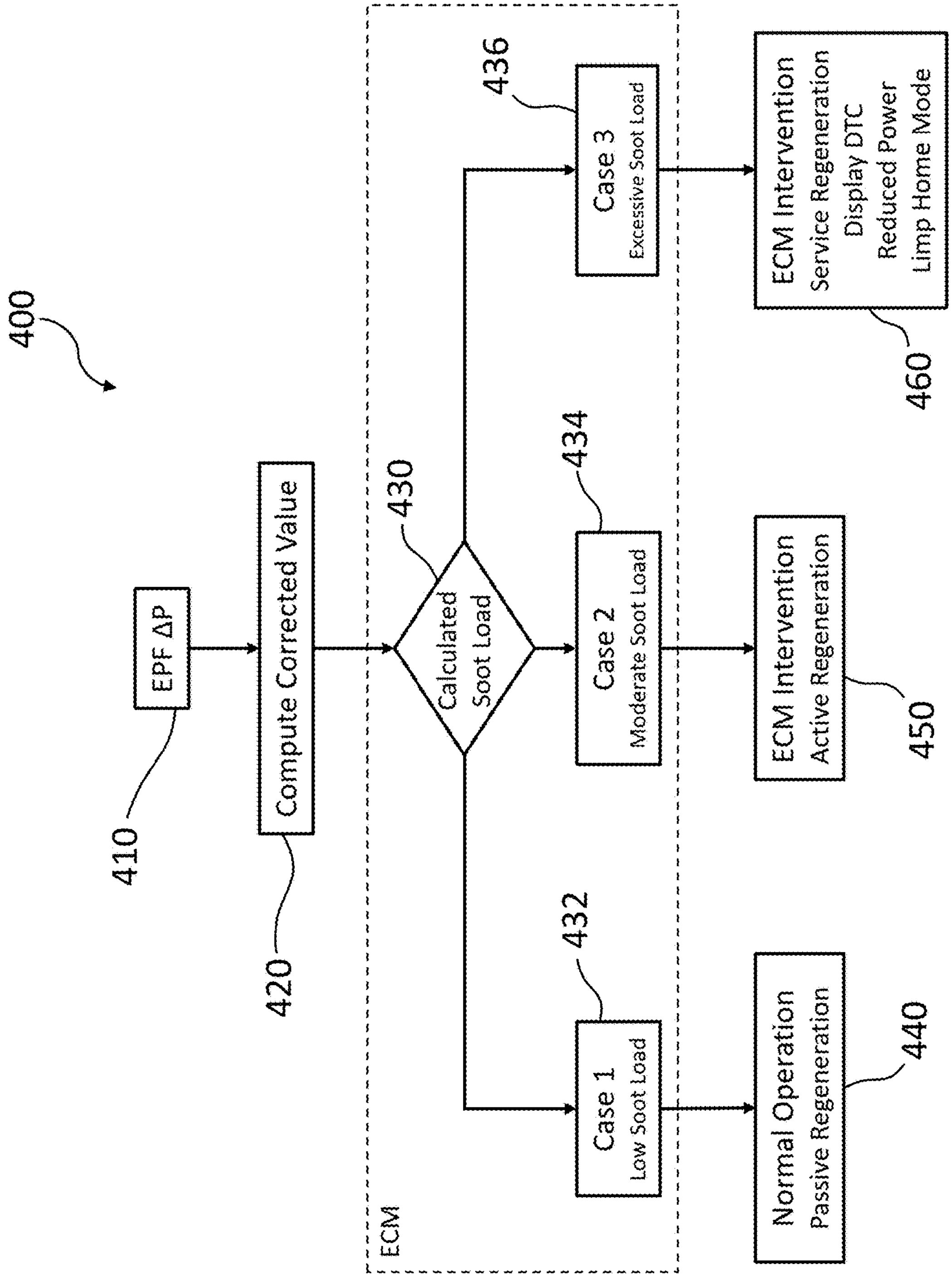
FIG. 5 is a flow chart illustrating a method for controlling regeneration while using a modified exhaust system.

FIG. 5 is a flow chart of a regeneration control method 400 for an enhanced exhaust system.

Step 410 states to sense the exhaust particulate filter (EPF) AP. This is sensed as described above.

Step 420 states compute corrected value. This step can be performed by the regeneration correction module as described above.

Step 430 states to calculate soot load. This step is performed as described above by the ECM to determine the soot load, namely, to determine the percent the EPF is occluded.

If the calculated soot load is below a low soot threshold where, in embodiments, the low soot threshold ranges from 60-65%, the control logic proceeds to case 1 (low soot load) 432. The ECM follows normal operation or passive regeneration protocol 440. For example, no action is taken by the ECM. The soot may be burned off during normal operations.

If the calculated soot load is within a moderate or medium soot range (e.g., between 65-80%), the control logic proceeds to case 2 (moderate soot load) 434. The ECM executes an intervention or active regeneration protocol 450. For example, in embodiments, the ECM may alter the combustion air/fuel ratio, inject fuel into the exhaust stream, or use a heater to raise exhaust gas temperatures (often to 600° C. or higher) to burn off the soot.

If the calculated soot load is greater than a high soot threshold where, in embodiments, the high soot threshold ranges from 80-90%, the control logic proceeds to case 3 (excessive soot load) 436. The ECM executes a service regeneration protocol 460. For example, one or more of the following actions are caused by the ECM: trigger a DTC, reduced power (limp home mode), and display check engine light.

Figure 6:
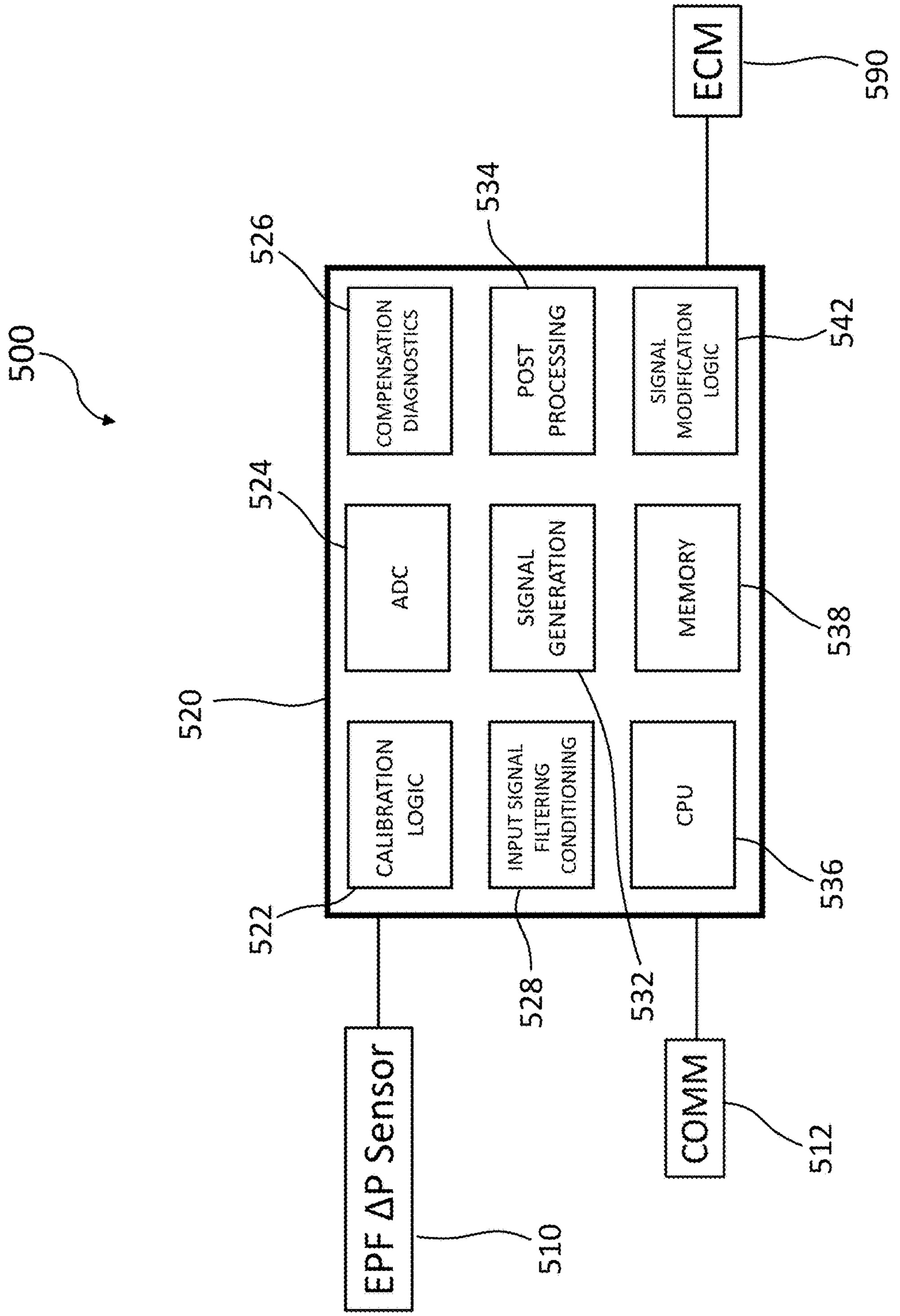
FIG. 6 is a block diagram of a RCM in accordance with embodiments of the invention.

FIG. 6 is a block diagram of an EPF management system 500 with regeneration control in accordance with embodiments of the invention.

The EPF management system 500 comprises an EPF sensor 510 for measuring AP as described above, a regeneration correction module (RCM) 520 for determining and generating a corrected AP signal, an optional communication line 512 for transferring information to and from the RCM via comm port (not shown), and an engine control module (ECM) 590 for controlling regeneration of the EPF as well as other functionality typically associated with the vehicle ECM.

The EPF AP sensor 510 is preferably a differential pressure sensor measuring pressure across the EPF and providing a digital output. However, in some embodiments, two independent pressure sensors may be arranged across the EPF and signals from each sensor are fed into the RCM, described herein. In embodiments, pressure sensors incorporate ground, low voltage signal, and 5-volt DC power wires.

The RCM 520 is shown comprising a number of subcomponents and submodules including at least one CPU 536 or microprocessor, memory 538 (such as, e.g., flash memory, static or dynamic RAM, EEPROM, and ROM, etc.), an analog to digital converter (ADC) 524 for converting sensor data in the analog format, and a signal generator 532 to produce the corrected signal.

The one or more processors 536 are operable with memory 538 to perform a number of subroutines including, without limitation, input signal pre-processing/filtering 528, signal modification logic 542, postprocessing 534, compensation diagnostics 526, and calibration logic 522.

In embodiments, input signal filtering 528 applies a bandpass filter to exclude data anomalies outside of a predefined range. In embodiments, input signal filtering will also exclude (or pass-through) parameters that are not relevant to the process taking place such as, for example, a signal comprising parameters that do not factor into the signal reconditioning. If these additional parameters are not being corrected, or contributing to the correction process, the input signal filtering will exclude them from the process and pass them through with no further handling.

In embodiments, the signal modification logic 542 operates to determine a corrected value for the raw AP input signal as described above.

In embodiments, the signal generator 532 is operable to generate the amended signal based on the input from the signal modification logic 542. In embodiments, the signal modification logic and signal generator operate to amend the raw signal based on, e.g., a lookup table, trained model, or fitted curve function or regression model.

In embodiments, post processing 534 is operable to apply a filter to exclude errant values which could inadvertently trigger unintended responses from the ECM. In embodiments, the post processing is operable to convert and filter data (e.g. noise) prior to passing the data to a storage location. In embodiments, the post processing is performed by the CPU 536 to filter, and clean the signal or otherwise prepare it for the ECM.

In embodiments, compensation diagnostics 526 are operable to monitor for output errors or signal drift. This allows for control of the output signal to ensure it maintains accuracy, and similar to a PID controller, this provides closed loop feedback which can correct for errors in the generated signal.

Typically, the RCM is factory programmed and calibrated for a specific vehicle type.

However, in some embodiments, the software installation may be performed by the user. For example, in some embodiments, calibration logic 522 on the RCM is operable to prompt the user to input the vehicle type, fuel type, and other information, so that the proper software for their specific vehicle type may be selected from a library of vehicle-specific signal modification modules stored on the RCM. However, in other embodiments, the library of modules is remote, and the proper software is downloaded by the user via comm line 512 and an internet-connected computing device. In embodiments software updates are periodically downloaded to the RCM when available. In embodiments, the RCM is programmed to periodically alert the user to check for software updates. Regardless of the way the vehicle-specific software is installed onto the RCM, once it is installed, the RCM shall be operable to provide the amended AP signals to the ECM as described above.

While embodiments and applications of this invention have been shown and described, it would be apparent to those skilled in the art that many more modifications are possible without departing from the inventive concepts herein. The invention, therefore is not to be restricted except in the spirit of the appended claims.

For example, in embodiments, the RCM comprises multiple different types of logic rules, equations, or trained models for predicting or correcting the raw signal. In embodiments, a selector engine is operable to select which model or logic rules to apply based on prompting the user for information such as vehicle type, or product number, etc. For example, during setup of a newly installed aftermarket low resistance exhaust assembly, the RCM may prompt the user for information about the exhaust assembly or type of model to apply. In embodiments, when a user selection is not made for a base model, the RCM applies a default base model such as the lookup table for determining the corrected signal. In embodiments, multiple models are applied to compute independent values and the average is taken to compute the final corrected signal to send to the ECM. Indeed, the invention contemplates a wide range of schemes to compute the corrected AP signal to send to the ECM.

Additionally, although the system and RCM have been described with reference to exhaust outlet tubes, the invention is not intended to be so limited. For example, in some embodiments, the RCM is programmed and operable to modify or correct a raw signal from an after-market low resistance exhaust inlet tube. In embodiments, the low resistance exhaust inlet tube comprises a shape, size or cross sectional area to reduce the backpressure. In some embodiments, the RCM is programmed and operable to modify or correct a raw signal from both of the after-market low resistance exhaust outlet tube and a low resistance exhaust inlet tube. Indeed, there may be many modifications of the above described designs which are intended to be part of the invention except where excluded in any of the appended claims.

The invention claimed is:

1. A low resistance exhaust system for enhancing the performance of an internal combustion engine of a vehicle comprising an Original Equipment Manufacturer (OEM) exhaust system, wherein the OEM exhaust system comprises a first exhaust outlet tube comprising a first exhaust tip open to atmosphere, an exhaust particulate filter (EPF) upstream of said first exhaust outlet tube, and a sensor assembly operable to measure pressure across the EPF, the low resistance exhaust system comprising:

- a second exhaust outlet tube adapted to couple to the EPF in place of the first exhaust outlet tube comprising a second exhaust tip open to atmosphere and having a lower flow resistance than the first exhaust outlet tube; and
- a correction module comprising at least one processor, memory, and signal generator, and wherein the correction module is configured to: receive at least one raw pressure signal from the sensor assembly representative of the pressure across the EPF in the flow path associated with the second exhaust outlet tube, and to compute and generate a corrected pressure signal corresponding to the at least one raw pressure signal received from the pressure sensor assembly by applying signal modification logic defined for operation with the second exhaust outlet tube; and to send the corrected pressure signal to a vehicle engine control module (ECM); and
- wherein the vehicle ECM is tuned to interpret pressure signals arising from the sensor assembly across the EPF in the flow path associated with the first exhaust outlet tube; and to evaluate the pressure signals to determine a regeneration action to mitigate soot buildup.

2. The system of claim 1, further comprising the EPF, and wherein the EPF is optionally a diesel particulate filter.

3. The system of claim 1, wherein the second exhaust outlet tube comprises at least one characteristic which causes the flow resistance of the second exhaust outlet tube to be lower than the first exhaust outlet tube, and wherein the at least one characteristic is selected from size and shape.

4. The system of claim 1, wherein the signal modification logic of the correction module comprises a trained machine learning model to calculate the corrected pressure signal.

5. The system of claim 1, wherein the signal modification logic of the correction module comprises a lookup table to produce the corrected pressure signal.

6. The system of claim 1, wherein the signal modification logic of the correction module comprises a non-linear equation to calculate the corrected pressure signal.

7. The system of claim 1, further comprising the ECM, and wherein the regeneration action is an active regeneration comprising one or more of the following: alter the combustion air/fuel ratio, inject fuel into the exhaust stream, or activate a heater to raise exhaust gas temperatures to burn off the soot buildup in the EPF.

8. The system of claim 1, further comprising an exhaust inlet tube, wherein the EPF is arranged between the exhaust inlet tube and the exhaust outlet tube.

9. The system of claim 1, wherein the correction module is further operable to filter the at least one raw pressure signal received from the sensor assembly to remove anomalies.

10. The system of claim 1, further comprising the sensor assembly.

11. The system of claim 10, wherein the pressure assembly is a differential pressure sensor (DPS).

12. A correction module for use with a vehicle having an internal combustion engine, the correction module comprising:

a signal generator;

at least one processor and memory configured to receive at least one raw pressure signal representative of the pressure across an exhaust particulate filter (EPF) in a flow path associated with a second exhaust tube; wherein the second exhaust tube has a lower flow resistance than a first exhaust outlet tube, and to compute and generate a corrected pressure signal corresponding to the at least one raw pressure signal received from the pressure sensor assembly by applying signal modification logic defined for operation with the second exhaust outlet tube, and to send the corrected pressure signal to a vehicle engine control module (ECM); and wherein the vehicle ECM is tuned to interpret pressure signals arising from the sensor assembly across the EPF in the flow path associated with the first exhaust tube; and to evaluate the pressure signals for a regeneration action to mitigate soot buildup.

13. The correction module of claim 12, wherein the signal modification logic is configured to apply a lookup table to produce the corrected pressure signal.

14. The correction module of claim 13, further operable to filter the at least one raw pressure signal received from the sensor assembly to remove anomalies.

15. A method for conditioning a pressure signal from a differential pressure sensor (DPS) in an exhaust system of a vehicle having an internal combustion engine, wherein the DPS measures pressure across an exhaust particulate filter (EPF) of an aftermarket exhaust outlet tube having a lower flow resistance than an original equipment manufacturer (OEM) exhaust outlet tube, the method comprising:

sending a raw pressure signal from the DPS to a correction module comprising at least one processor, memory, and a signal generator;

generating, by the correction module, a corrected pressure signal to send to an OEM-calibrated engine control module (ECM); wherein the signal generator, at least one processor and memory are configured to transform the raw pressure signal into the corrected pressure signal based on at least one dataset previously mapping DPS pressures for the OEM exhaust outlet tube and the aftermarket exhaust outlet tube based on soot load; and sending the corrected pressure signal to the OEM-calibrated ECM.

16. The method of claim 15, wherein the correction module is configured to transform the raw pressure signal into the corrected pressure signal based on a lookup table.

17. The method of claim 15, further comprising filtering the at least one raw pressure signal received from the DPS to remove anomalies.

18. The method of claim 15, further comprising performing a regeneration action comprising one or more of the following: alter the combustion air/fuel ratio, inject fuel into the exhaust stream, or activate a heater to raise exhaust gas temperatures to burn off the soot buildup in the EPF.

19. The correction module of claim 12, wherein the sensor assembly is a differential pressure sensor (DPS).

20. The correction module of claim 12, further comprising compensation diagnostics, optionally a PID controller, operable to monitor for output errors or signal drift to maintain accuracy.

21. The correction module of claim 12, wherein the compute is based on, in addition to the raw pressure signal, at least one parameter selected from the group comprising: engine speed, vehicle speed, engine load, and intake air mass.

22. The system of claim 1, wherein the compute is based on, in addition to the raw pressure signal, at least one parameter selected from the group comprising: engine speed, vehicle speed, engine load, and intake air mass.

23. The method of claim 15, wherein the transform is based on, in addition to the raw pressure signal, at least one parameter selected from the group comprising: engine speed, vehicle speed, engine load, and intake air mass.

* * * * *